United States Patent
Greenwell et al.

(10) Patent No.: US 7,744,789 B2
(45) Date of Patent: Jun. 29, 2010

(54) METHOD FOR CURING A THICK, NON-UNIFORM RUBBER ARTICLE

(75) Inventors: I. Douglas Greenwell, Greer, SC (US); Michael J. Luneau, Simpsonville, SC (US); Donald Faulkner, Easley, SC (US)

(73) Assignees: Michlein Recherche et Technique S.A. (CH); Societe detechnologie Michelin (FR)

( * ) Notice: Subject to any disclaimer, the term of this patent is extended or adjusted under 35 U.S.C. 154(b) by 279 days.

(21) Appl. No.: 11/711,214

(22) Filed: Feb. 27, 2007

(65) Prior Publication Data
US 2007/0152362 A1 Jul. 5, 2007

Related U.S. Application Data

(63) Continuation of application No. PCT/US2005/031355, filed on Sep. 2, 2005.

(51) Int. Cl.
*B29C 35/02* (2006.01)

(52) U.S. Cl. .................. 264/40.6; 264/236; 264/326; 264/347

(58) Field of Classification Search ............... 264/40.6, 264/236, 326, 347; 153/209.18; 152/209.18
See application file for complete search history.

(56) References Cited

U.S. PATENT DOCUMENTS

| | | | |
|---|---|---|---|
| 603,154 A | 4/1898 | Rosenblatt et al. | |
| 1,408,100 A | 2/1922 | Krusemark | |
| 1,477,879 A | 12/1923 | Kilborn et al. | |
| 1,509,259 A | 9/1924 | Rett et al. | |
| 1,604,451 A | 10/1926 | Krusemark | |
| 1,604,452 A | 10/1926 | Krusemark | |
| 1,718,631 A | 6/1929 | Brundage | |
| 1,733,064 A | 10/1929 | Lambert | |

(Continued)

FOREIGN PATENT DOCUMENTS

EP 0485127 A1 5/1992

(Continued)

OTHER PUBLICATIONS

Jian Tong et al; Finite Element Analysis of Tire Curing Process; Journal of Reinforced Plastics and Composites; vol. 22, No. 11/2003; Sage Publication 2003 USA.

(Continued)

*Primary Examiner*—Joseph S Del Sole
*Assistant Examiner*—Timothy Kennedy
(74) *Attorney, Agent, or Firm*—E. Martin Remick; Frank J. Campigotto; Kurt J. Fugman

(57) ABSTRACT

Finite element analysis or thermocouple probes are used to determine the state of cure for each zone of a non-uniform, thick rubber article, such as a large tire or a tread for a tire. From this knowledge of those cure-limiting zones, heat transfer elements are added to the mold to enhance the transfer of heat into these cure-limiting zones and to provide a more optimum cure. The use of heat transfer pins and/or mini-sipes are an efficient and practical means of reducing total cure time in the press and optimizing cure state without substantially affecting the performance of the article such as the tire. Reductions in cure time of 10% or more are demonstrated.

8 Claims, 14 Drawing Sheets

U.S. PATENT DOCUMENTS

| | | | |
|---|---|---|---|
| 1,778,071 A | 10/1930 | Fleiter | |
| 1,877,988 A | 9/1932 | Schrank | |
| 2,031,560 A | 2/1936 | Day | |
| 2,047,858 A | 7/1936 | Day | |
| 2,066,265 A | 12/1936 | Freeman | |
| 2,128,417 A | 8/1938 | Kerr | |
| 2,173,588 A | 9/1939 | Mahler | |
| RE22,188 E | 9/1942 | Minor | |
| 2,504,090 A | 4/1950 | Sanderson | |
| 2,618,812 A * | 11/1952 | Hulswit, Jr. et al. | 425/23 |
| 2,627,888 A | 2/1953 | Bull | |
| 3,102,425 A | 9/1963 | Westman et al. | |
| 3,397,583 A | 8/1968 | Sperberg | |
| 3,409,064 A | 11/1968 | Leonard | |
| 3,443,280 A | 5/1969 | Hugger | |
| 3,479,693 A | 11/1969 | Cantarutti | |
| 3,489,833 A | 1/1970 | Lehnen | |
| 3,632,712 A | 1/1972 | Miller | |
| 3,637,001 A | 1/1972 | Roberts et al. | |
| 3,645,313 A | 2/1972 | Roberts et al. | |
| 3,649,729 A | 3/1972 | Davis et al. | |
| 3,659,974 A | 5/1972 | Neugroschl | |
| 3,718,721 A | 2/1973 | Gould et al. | |
| 3,749,145 A | 7/1973 | Hart et al. | |
| 3,819,915 A | 6/1974 | Smith | |
| 3,848,651 A | 11/1974 | French | |
| 3,998,256 A | 12/1976 | Verdier | |
| 4,022,555 A | 5/1977 | Smith | |
| 4,027,543 A | 6/1977 | Johnston | |
| 4,044,600 A | 8/1977 | Claxton et al. | |
| 4,266,592 A | 5/1981 | Takigawa et al. | |
| 4,298,046 A | 11/1981 | Herbelleau et al. | |
| 4,305,445 A | 12/1981 | Yoshioka et al. | |
| 4,344,142 A | 8/1982 | Diehr, II et al. | |
| 4,371,483 A | 2/1983 | Mattson | |
| 4,422,987 A | 12/1983 | Arimatsu | |
| 4,517,146 A | 5/1985 | Takasu et al. | |
| 4,568,259 A | 2/1986 | Mattson | |
| 4,608,218 A | 8/1986 | Rummler et al. | |
| 4,723,584 A | 2/1988 | Yamaguchi et al. | |
| 4,779,206 A | 10/1988 | Mattson et al. | |
| 4,819,177 A | 4/1989 | Jurgensen | |
| 4,861,253 A | 8/1989 | Mattson | |
| 4,979,549 A | 12/1990 | Kaneko | |
| 5,020,770 A | 6/1991 | Moberg | |
| 5,027,876 A | 7/1991 | Chrobak et al. | |
| 5,055,245 A | 10/1991 | Hisatomi et al. | |
| 5,198,049 A | 3/1993 | Hojo | |
| 5,221,379 A | 6/1993 | Nicholas | |
| 5,289,862 A | 3/1994 | Schuster | |
| 5,327,953 A * | 7/1994 | Ichiki | 152/209.25 |
| 5,481,319 A | 1/1996 | Kershaw et al. | |
| 5,486,319 A | 1/1996 | Stone et al. | |
| 5,680,315 A | 10/1997 | Rimondi et al. | |
| 5,784,283 A | 7/1998 | Rimondi et al. | |
| 5,896,905 A | 4/1999 | Lurois | |
| 5,993,185 A | 11/1999 | Furr | |
| 6,196,288 B1 | 3/2001 | Radulescu et al. | |
| 6,374,886 B1 | 4/2002 | Eromaki | |
| 6,402,489 B1 | 6/2002 | Dyer | |
| 6,413,068 B1 | 7/2002 | Steidl et al. | |
| 6,478,991 B1 | 11/2002 | Mancosu et al. | |
| 2001/0002602 A1 * | 6/2001 | Nakamura | 152/209.4 |
| 2002/0017732 A1 | 2/2002 | Koyama et al. | |
| 2002/0100527 A1 | 8/2002 | Radulescu et al. | |
| 2003/0089439 A1 | 5/2003 | Thiebaud | |
| 2004/0007300 A1 | 1/2004 | Foucher | |
| 2004/0126451 A1 | 1/2004 | Wood et al. | |
| 2006/0115551 A1 | 6/2006 | Peukert | |

FOREIGN PATENT DOCUMENTS

| | | |
|---|---|---|
| EP | 0578105 A2 | 1/1994 |
| EP | 1172198 A2 | 1/2002 |
| GB | 546975 | 8/1942 |
| JP | 62037107 | 2/1987 |
| JP | 3-355071 | 7/1993 |
| JP | 07195370 | 8/1995 |
| JP | 07195370 A | 8/1995 |
| JP | 8238656 | 3/1998 |
| JP | 2000372554 | 6/2002 |
| JP | 2002172622 A | 6/2002 |
| JP | 3355071 | 9/2002 |
| JP | 2002-307442 A | 10/2002 |
| JP | 2002307442 A | 10/2002 |

OTHER PUBLICATIONS

Irl Douglas Greenwell, The Development of a Smart Tire-Curing Process, Dissertation filed at the University of South Carolina, 2004.
International Search Report, Mailing date: Apr. 8, 2008 for PCT/US07/84015 filed Nov. 8, 2007.

* cited by examiner

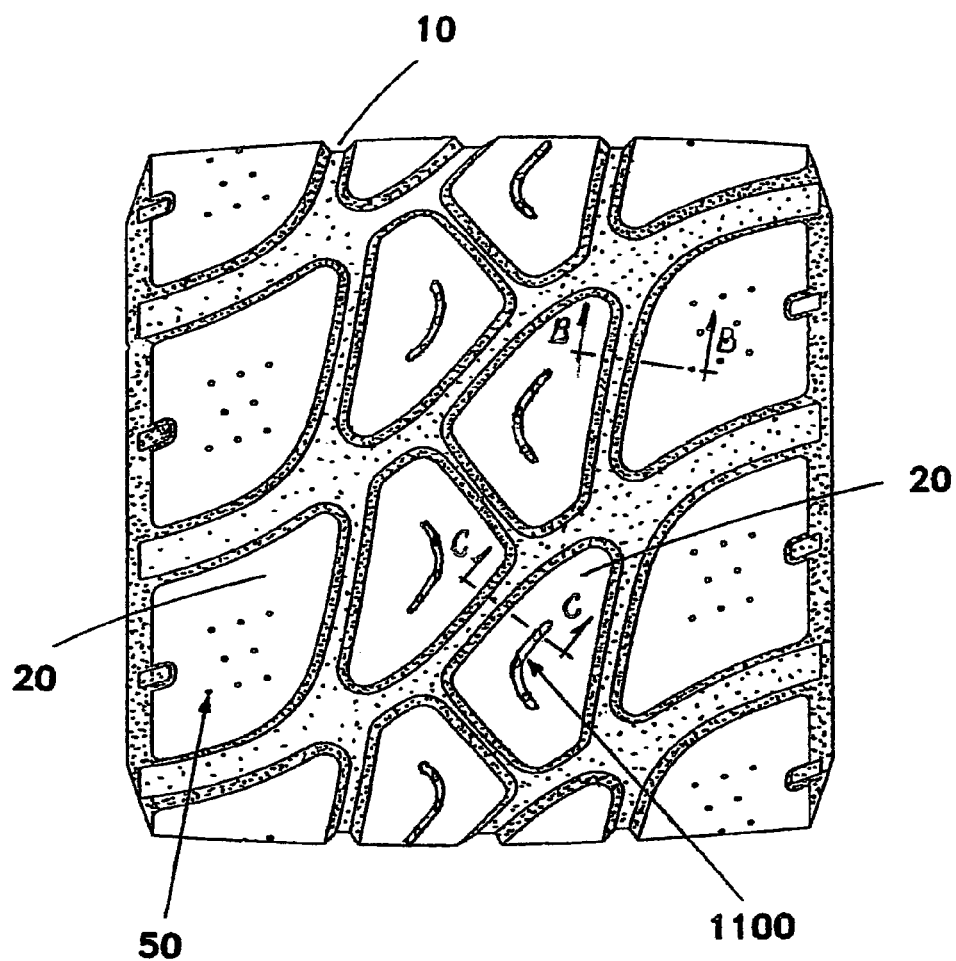
*Fig. 14A*
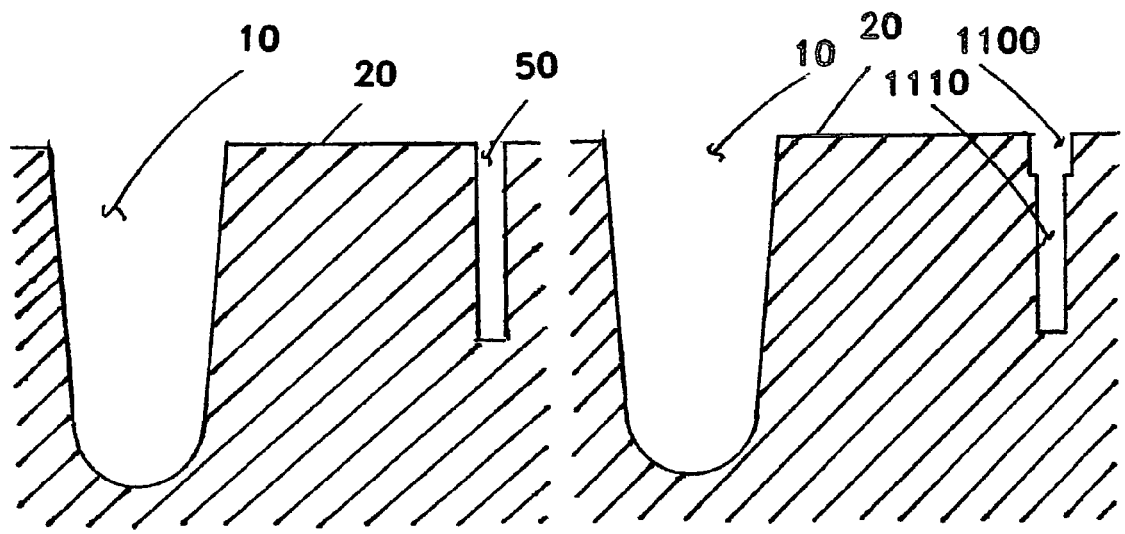
*Fig. 14B*      *Fig. 14C*

US 7,744,789 B2

METHOD FOR CURING A THICK, NON-UNIFORM RUBBER ARTICLE

This application is a continuation and claims the benefit of International Application No. PCT/US2005/031,355, filed Sep. 2, 2005, which claimed priority to International Application No. PCT/US2004/028,727, filed Sep. 3, 2004.

BACKGROUND OF THE INVENTION

1. Field of the Invention

The present invention is in the field of curing thick, non-uniform rubber articles, and more particularly in the field of curing tires such as truck tires.

2. Description of the Related Art

Rubber articles, such as pneumatic tires, for years have been vulcanized or cured in a press wherein heat is applied externally by the tire mold and internally by a curing bladder for a certain length of time to effect vulcanization of the tire. These presses, which are well known in the art, generally employ separable mold halves or parts (including segmented mold parts) with shaping and curing mechanisms, and utilize bladders into which shaping, heating and cooling fluids or media are introduced for curing the articles. The aforesaid curing presses typically are controlled by a mechanical timer or a programmable logic controller (PLC) which cycles the presses through various steps during which the article is shaped, heated and in some processes cooled prior to unloading from the press. During the curing process the article is subjected to high pressure and high temperature for a preset period of time which is set to provide sufficient cure of the thickest part of the article. The cure process usually continues to completion outside the press.

Rubber chemists are faced with the problem of predicting the time period within which each part of the rubber article will be satisfactorily cured and, once such a time period is established, the article is heated for that period. This is a relatively straight-forward analysis for a rubber article that is relatively thin and has uniform geometry and similar composition throughout. It is a much more difficult analysis when this is not the situation such as with a complex article such as a tire, and particularly with large tires such as truck tires, off-the-road tires, farm, aircraft and earthmover tires. The extent of cure in these types of tires is affected not only by the variance in geometry from part to part in the tire but also by the composition change and laminate structure as well. While the time control method has been used to cure millions of tires, because of the varying composition and geometry in the tire, some parts of the tire tend to be more cured than other parts. By setting the time period to cure the most difficult part to cure, over-cure of some parts occurs, and production time on the vulcanizing machinery is wasted and production efficiency is reduced.

Various designs for curing presses and various curing methods have been proposed to provide a more uniform cure to thick rubber articles. Some methods use differing materials for mold construction, insulating materials, differing compositions for parts of the tire, multiple curing zones so heat can be applied for a longer time, or methods for directing more heat to the thickest or most complex part of the rubber article. Patents which show various curing methods and apparatus are as follows: U.S. Pat. Nos.: 3,718,721; 3,819,915; 4,371,483; 4,044,600; 4,861,253; 5,055,245; 5,481,319; 6,413,068; and 6,478,991; EPO Patent Applications 0,485,127A1; 0,578,105A2 and 1,172,198A2; and Japanese Patents JP62037107; JP 0,7,195,370 and JP 2002,172,622A. However, none of the above methods and apparatus has proven entirely satisfactory, and time control remains the typical method of curing non-uniform thick rubber articles. Thus, the tire industry is faced with an issue of producing a uniformly cured tire in a faster time period.

The invention is directed to an improved method of curing a non-uniform, thick rubber article such as a truck tire or a tread for a tire. The method uses heat transfer elements which are specifically chosen and specifically placed in a mold to transfer heat into the article at the cure-limiting parts of the article. This results in small apertures in the articles where the heat transfer elements protrude into the article. Since these apertures are small, they do not change the relative function and performance of the article. The apertures are basically seen as pin holes or mini-sipes.

Siping is well known in the tire art to create functional advantages such as traction, water evacuation, etc. U.S. Pat. Nos. 6,196,288; 4,298,046; 5,289,862 and 5,896,905 disclose various effects of siping with tires. The distinction between the use of siping in the prior art and the use of the mini-sipes of this invention is that the siping in the prior art is directed to causing or creating a functional change in the tire where the mini-sipes of the invention are chosen to effect an improved cure without changing the relative functional performance of the tire or tread being cured.

As for the pin holes, the same distinction applies between the prior art and the invention. Pin holes in the tread are known in the tire prior art to create functional changes in wear, traction, water evacuation, performance, etc. (See U.S. Pat. Nos.: 2,504,090; 3,409,064; 3,637,001; 3,645,313; 3,749,145; 3,998,256; 4,266,592; 4,305,445; 4,723,584; 5,027,876 and 6,374,886; U.S. Patent Publication Nos. 2003/0089439 and 2002/0100527; and Great Britain Patent No. 546,975. Other patents show lateral pin holes introduced into the side of the tread of a tire to create a functional change in the tire performance. (See U.S. Pat. Nos.: 1,408,100; 1,509,259; 1,733,064; 1,778,071; 1,877,988; 3,848,651; and 4,979,549; Japanese Patent Publication No. P2002-307442A and Japanese Application No. 3-355071).

SUMMARY OF THE INVENTION

The present invention is an improved method of curing a non-uniform thick rubber article using conventional curing molds and presses by adapting the molds with heat transfer elements at specific positions in the mold which are predetermined to direct heat into cure-limiting parts of the rubber article. The invention not only causes a faster cure of the article but also results in a more uniform cure state of the rubber article. The selection and positioning and use of the heat transfer elements do not significantly change the function or performance of the rubber article. Of particular note, only the mold is altered and the curing apparatus as a whole and the compositions of the rubber article do not have to be changed or adjusted. The above improvement in curing is achieved with a reduction in total cure time in the mold thereby increasing productivity.

A further embodiment of the invention is a method of making a mold for curing non-uniform, thick articles such as truck tires or treads for tires comprising the steps of (a) determining which portions of the article should receive additional heat during the curing in order to speed up cure of those portions during the time of cure, and (b) affixing heat transfer elements into the mold to intrude into those portions of the article requiring additional heat during the curing of said tire.

A further embodiment of the invention is a method of reworking a tire mold by the addition of heat transfer elements to said mold, wherein said heat transfer elements are spaced and configured so as to provide for a more even curing of all portions of the tire to be inserted into said mold.

BRIEF DESCRIPTION OF THE DRAWINGS

FIG. 14(a) shows a tire tread which was cured using pin heat transfer elements and mini-sipe heat transfer elements of this invention. The lateral grooves (10) are about 24 mm in depth from the top surface of the tread block (20). The pin holes (50) are at a depth from the top surface of the tread block of about 14 mm (FIG. 14(b)). The mini-sipes (1100) are at a depth of about 3 mm from the top surface of the tread block (20), and three pin holes (1110) at a depth of about 14 mm are located in each mini-sipe (FIG. 14(c)).

DETAILED DESCRIPTION OF EMBODIMENTS

Figure 1:
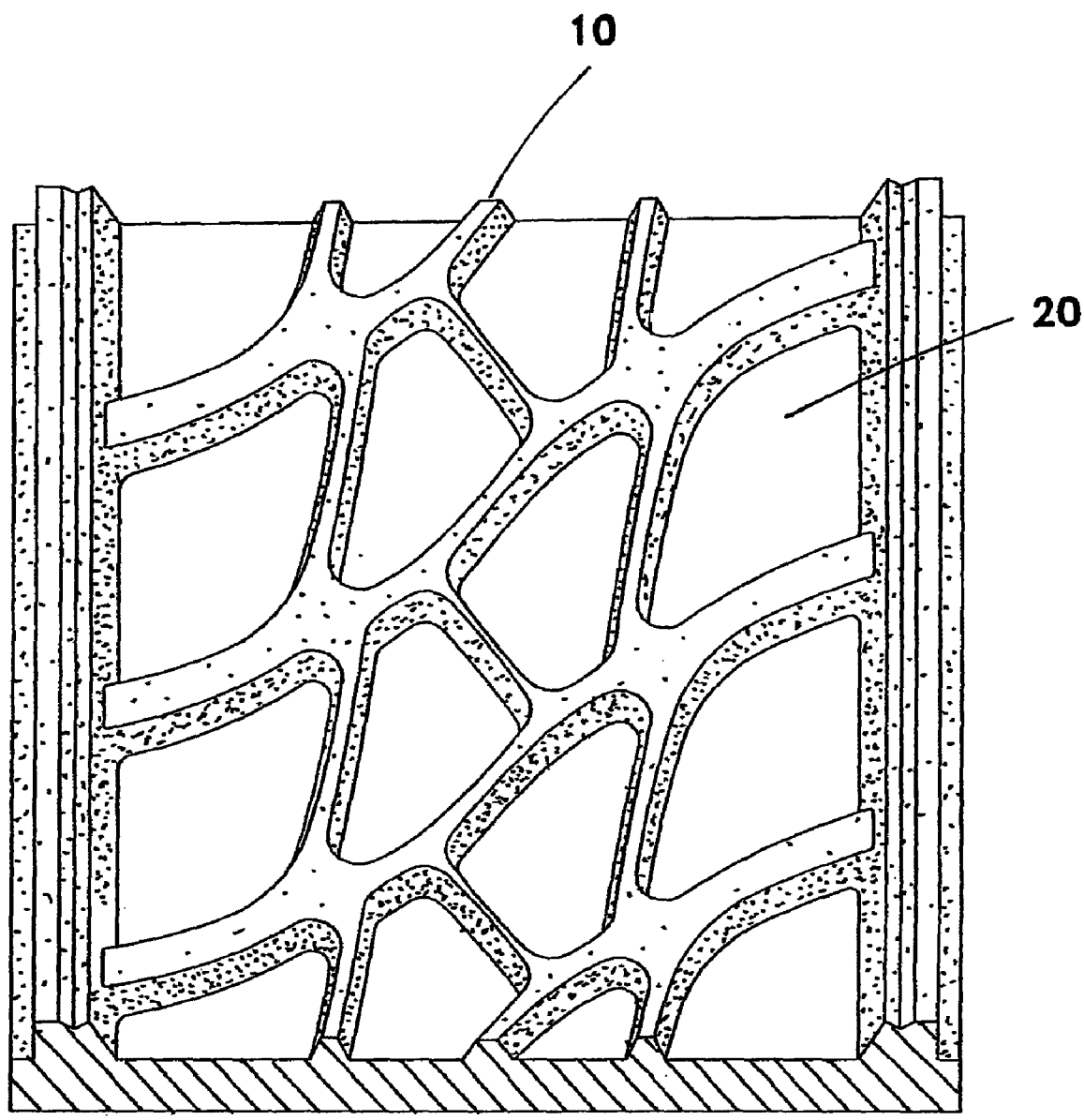
FIG. 1 shows a top section of a flat tread mold for manufacturing a cured tread for recapping a tire. The top part produces the sculpture to the tread. No. (10) refers to the mold section which imparts the large "full depth" grooves to the tread pattern which grooves form the tread blocks (20).

In the process of curing a non-uniform, thick rubber article such as a pneumatic tire, the challenge for the industry is to provide a curing process that provides a sufficient amount of heat energy to the non-uniform, thick parts of an article to effect substantial cure of said parts without overcuring the thinner parts of the article, and to do so in a productive manner.

In using the method of the invention, one must first determine which parts of the non-uniform, thick rubber article require additional heat energy to affect an efficient and substantial cure of said parts. This can be done using known techniques such as finite element analysis (FEA) or thermocouple probes in determining the state of cure for each zone of the article. From the knowledge of these zones and the cure rates of the compositions, different parts of the article are identified to receive enhanced heat transfer in order to provide a faster cure time and a more even cure. The invention uses heat transfer elements as an efficient and practical means of accomplishing this goal. Specific heat transfer elements are proposed which cause a more uniform state of cure for all zones of a tire or tread and yield a reduction in cure time in the press. Reductions in cure time in the press of up to 10% or more were obtained. In addition, the use of this improved curing method was evaluated with respect to basic tire performance parameters to show that the use of specific heat transfer elements had no substantial impact on the performance of the tire.

Hence, the present invention is a method of curing a non-uniform thick rubber articles comprising the steps of:
  (a) predetermining the cure rates of the article in its parts to determine the cure-limiting parts;
  (b) modifying the mold for the article by placing at least one heat transfer element in the mold to protrude outward from the inner surface of the mold and intrude into the article at the cure-limiting points in the article;
  (c) placing the article inside the mold;
  (d) applying heat to the article and heat transfer element until the article reaches a defined state of cure; and
  (e) removing the article from the mold.

Hence, the modified mold has at least one interior face contacting the article, which interior face has at least one heat transfer element protruding outward from the interior face of the mold, whereby heat is transferred from the heat transfer element to a cure-limiting part of the article during cure.

The present invention is particularly applicable as a method of curing a tread for a tire, comprising the steps of:
(a) pre-determining the curing rates of substantially all portions of the tread to be inserted into the mold to determine the cure-limiting parts,
(b) placing the uncured tread into a conventional mold that has been adapted to include at least one heat transfer element which protrudes into cure-limiting parts of the tread;
(a) applying heat to the tread through the mold and the heat transfer element; and
(b) removing the heat transfer element from the tread while removing the tread from the mold.

A further embodiment of the invention is a method of making or adapting a conventional mold for curing non-uniform, thick rubber articles comprising the steps of:
(a) determining the heating rate of substantially all portions of the article to be inserted thereto;
(b) determining which portions of the article are cure-limiting so they can receive additional heat during the curing of said article; and
(c) affixing at least one heat transfer element onto the mold to protrude outward from the mold's inner surface and intrude into those cure-limiting portions of the article during the cure of said article.

The present invention is particularly applicable to creating a mold for a tire, wherein the mold comprises an interior face which contacts the tire, comprising the steps of:
(a) determining the heating rate of substantially all portions of the tire to be inserted into the mold.
(b) determining which portions of the tire are cure-limiting and need additional heat during the curing of said tire; and
(c) affixing at least one heat transfer element onto the tire mold to protrude outward from the inner surface of the mold and intrude into those portions of the tire requiring additional heat during the curing of said tire.

Finite Element Analysis

According to the present invention, an evaluation is made of the heat transfer which occurs to parts of an article such as a tire or tread during cure using conventional methods. One known method of determining heat transfer is to build a tire, place thermocouples within the tire and record the thermal profiles during the curing process. Knowing the thermal profile, one can use reaction kinetics to determine the state of cure throughout the tire.

Another known method is to use Finite Element Analysis (FEA) which consists of a computer model of an article that is subjected to external loads (i.e., thermal) and analyzed for results. Heat transfer analysis models the conductivity or thermal dynamics of the articles. See, e.g., Jain Tong et al, "Finite Element Analysis of Tire Curing Process", Journal of Reinforced Plastics and Composites, Vol. 22, No. 11/2003, pages 983-1002.

State of Cure and Alpha

Alpha is a measure of the state of cure, and is given by the following equation:

$$alpha = (time\ of\ curing\ in\ tire\ mold)/t99$$

where t99 is the time for completion of 99% of the cure as measured by torque as shown by a rheometer curve. ASTM D2084 and ISO 3417 describe how to measure cure times (time t0 for the onset of cure, and time t99 for 99% completion of cure) for rubber compounds using an oscillating rheometer. These standards are incorporated by reference.

The process of the invention will now be described to show how it differs with conventional cure processes and molds. The process of the invention is particularly directed to non-uniform thick rubber articles. By non-uniform is meant (a) varying geometrical thickness in the article, (b) varying materials composition in the article, (c) presence of laminate structure in the article, and/or (d) all of the above. A typical large tire, such as a truck tire, an off-the-road tire, a farm tire or an earthmover tire, provides a good example of a non-uniform, thick rubber article. However, any non-uniform, thick rubber article, such as hoses, belts, vibration mounts, bumpers, etc., can be efficiently cured using the method of this invention.

In a conventional curing method using a conventional mold, an analysis can be made of the rate of heating in all parts of the rubber article. However, the result is that, even if higher temperatures or longer times are used in various parts of the mold, the total cure time period is dictated by the time it takes to substantially cure the "cure-limiting" part(s) of the rubber article. By "cure-limiting" is meant the part(s) of the article that are difficult to cure or take the longest to cure either due to the heat transfer characteristics of the composition, and the thickness and/or complexity of the article. This results in longer cure times in the press and inefficient use of the curing apparatus. The method of the invention achieves (a) a reduction in the cure time period in the press and (b) a more uniform state of cure, without changing the relative performance of the article.

As in the conventional cure process, the method of the invention uses known FEA analysis, thermocouple analysis or other means to determine the various rates and states of cure in the parts of the non-uniform article. However, the inventor's investigation went further in determining what types and configurations of heat transfer elements were effective in reducing the cure time period and achieving a more uniform state of cure without substantially affecting the performance of the rubber article.

The inventors experimented with various shapes and sizes of heat transfer elements for use with tires and treads for tires, including shoulder grooves, sipes (straight, curved and wedge shaped) and pins. They found that all of these types of heat transfer elements could reduce the over-all cure time for the tire or tread, but the use of most of these elements resulted in significant changes to the rigidity of the tread blocks which would affect the performance of the tire. Only the use of the described pins and mini-sipes resulted in reduced cure time and improved uniformity of cure without substantially affecting the rigidity of the tread block and the performance of the tire.

The pins and mini-sipes for the molds can be made from any material compatible with the mold. For tire molds, the materials are typically steel or aluminum. The pins and mini-sipes are added to or adhered to the mold in any conventional manner such as welding, or can be designed into a new mold. The rest of the curing apparatus such as the press, etc. remains unchanged.

The mini-sipes can have any shape such as straight, curved, round, elliptical or wedge-shaped. The mini-sipes range between 1 and 3 mm in width, and have a length such that they extend into the article from about 5% to about 20% of the thickness of the article. For truck tires, this would typically range from about 2 to about 6 mm. The mini-sipe can extend across the full face surface of the article, such as the tread block, or less. For truck tires, a mini-sipe pattern within the boundary of the tread block has proven useful.

The pins can be round, square, rectangular or elliptical in shape. If round, their diameter ranges from about 1 mm to 3 mm. If square, the sides range from about 1 to 2 mm. If another shape, the lesser dimension ranges from about 1 to 2 mm in length, and the larger dimension ranges from about 1 to 3 mm in length. Since the pins are less intrusive than mini-sipes, their length is such that they can extend into the article from about 5% to about 80% of the thickness of the article, but preferably they extend about 25% to about 50% of the thickness of the article. For truck tires, this ranges from about 3 mm to 25 mm, and preferably from about 10 mm to about 15 mm into the tread block. The pins can be configured to protrude into the article perpendicular to the surface, inclined to the surface or lateral to the surface of the article.

The protrusions of the heat transfer elements into the article, such as a tire or a tread, cause an indentation on the surface of the article. The reduction in the total surface area of the article caused by the indentations, such as the contact area on a tread block, is less than 8%, and preferably less than 5%.

In order for the article to function in its intended manner, the rigidity of the article should not be substantially changed by the indentations caused by the heat transfer elements. For tire treads, this means that the tread block should maintain a rigidity after the use of the method of this invention similar to that it would have if the heat transfer elements were not used. The change in rigidity is related to the percent reduction in volume caused by the use of the heat transfer element. For this invention, the use of heat transfer elements which cause a reduction in the rigidity of 4% or less, and more preferably of 2% or less, are included.

The reduction in rigidity is calculated by the formula "volume of the aperture created by the heat transfer element" divided by the "total volume of the article (or divided section of the article which has been acted upon by the heat transfer element)".

When the rigidity calculation is applied to a tire tread block, a multiplier was applied. The multiplier value was "1" for the first increment of 1 to 5 mm of depth; the multiplier was "2" for a second increment of over 5 to 10 mm of depth; the multiplier was "4" for a third increment of over 10 to 15 mm of depth; and the multiplier was "8" for any other increment of over 15 mm of depth or more.

If more than one increment is involved (which is often the case), the rigidity is calculated for each increment and the values obtained are added to give the total reduction in rigidity. For example, if a "pin" heat transfer element is used which protrudes into a tread block by 14 mm, this leaves a "hole" in the block which corresponds to the diameter and length of the pin. So, a rigidity calculation would be made for the volume of the aperture in first five mm increment and the multiplier is "1". For the second five mm increment, another rigidity calculation is made for the volume of the aperture in the second increment and the multiplier is "2". For the last four mm increment, another rigidity calculation is made for this increment and the multiplier is "4". Then, the three calculations are added together to get the total reduction in rigidity caused by the "pin" heat transfer element. The same process is used for all the shapes and types of heat transfer elements.

The following non-limiting examples illustrate the methods of the invention.

EXAMPLE 1

Cure of a Tread for Recapping a Tire

The present method was applied to the cure of a tread for recapping a tire.

Figure 2:
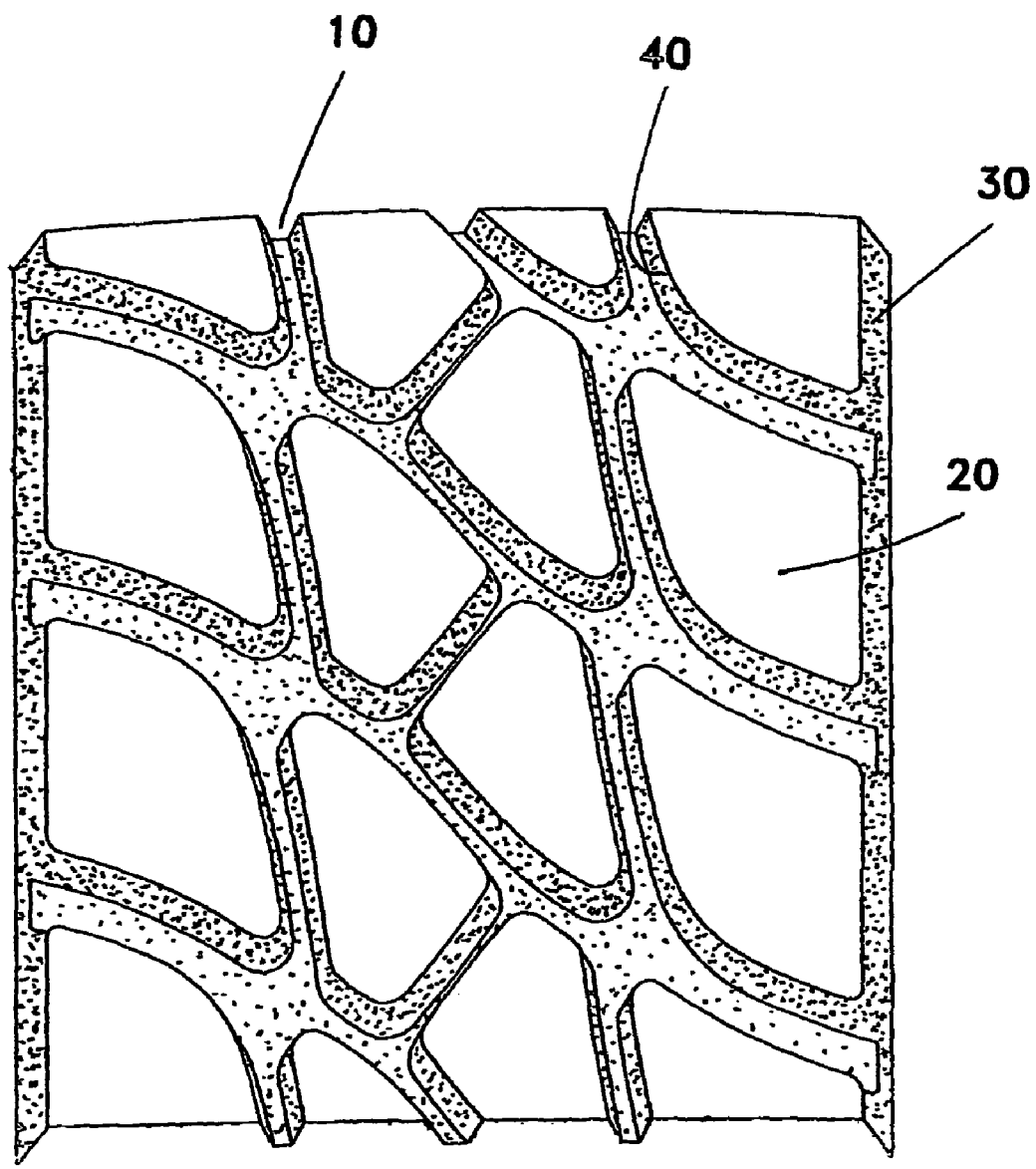
FIG. 2 shows a cured tread pattern for a tread for recapping a tire which is cured in a conventional manner. The large lateral grooves (10) and the tread blocks (20) are shown. The tread has a thickness of about 25 mm (30) from its bottom surface to the top surface of the tread blocks. The depth of the lateral grooves is about 22 mm (40).
Figure 3:
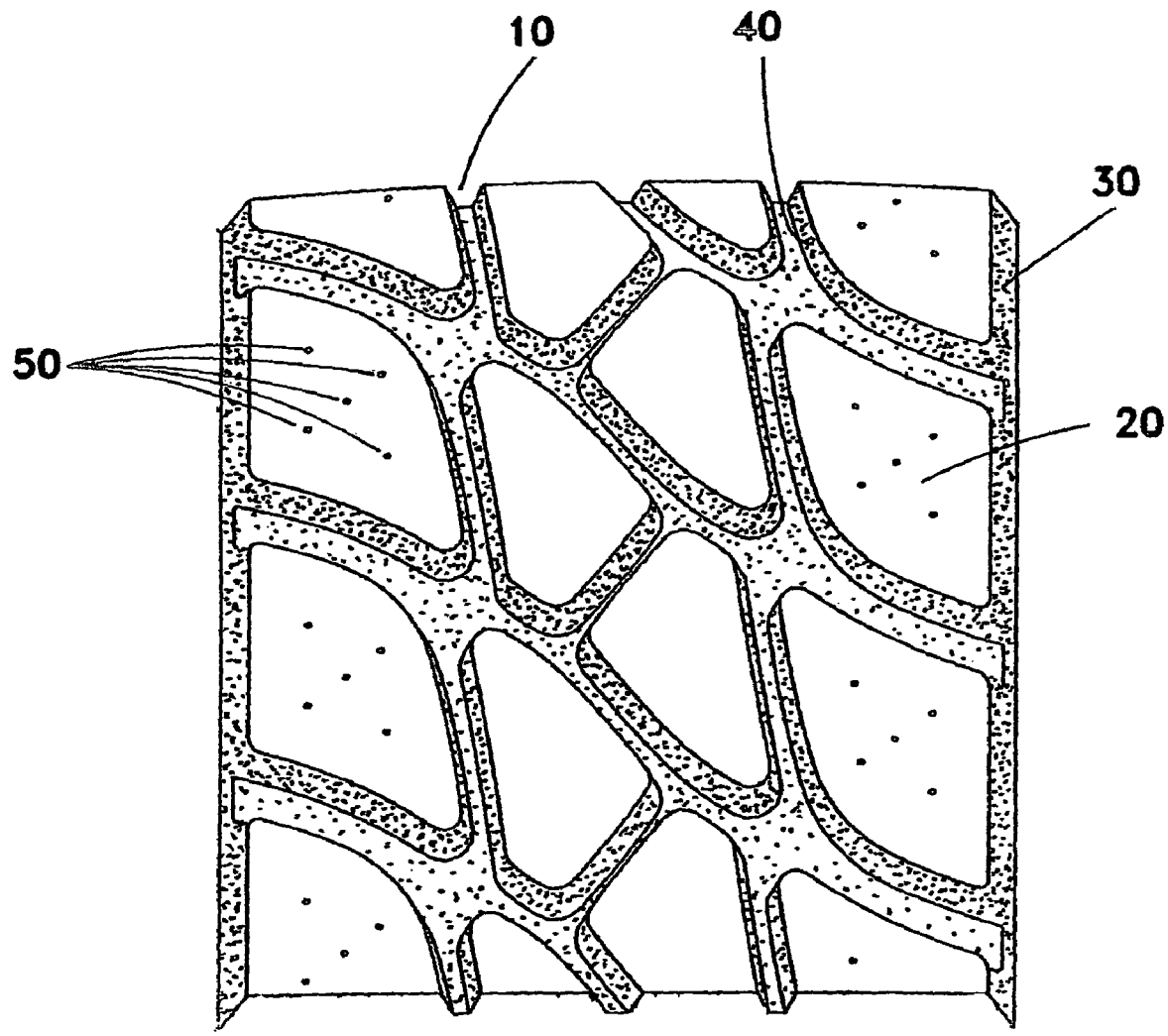
FIG. 3 shows a cured tread pattern for a tread for recapping a tire which is cured using a method of this invention. The only difference between the cured tread pattern in FIG. 2 and that shown in FIG. 3 is the presence of the "pin holes" (50). The pin holes have a depth from the top surface of the tread block of about 14 mm.

FIG. 1 shows a conventional flat tread sculptured mold segment for a pre-cured tire tread. FIG. 2 shows a sculptured tread pattern for the tread as a result of using the mold of FIG. 1 and using a conventional molding process. FIG. 3 shows the sculptured tread pattern resulting from the addition of pin heat transfer elements to the mold of FIG. 1. In defining the relative locations for the heat transfer elements (pins), the minimum cure-state location was first identified in the x-y plane of the tread pattern. This position was then used as a basis for comparison in the z-direction (or through the thickness of the tread block). The process of the invention can be used with a uniform composition tread or with a dual tread. A dual tread refers to a first tread layer used over a second tread layer.

In a commercial platen precure retread press, the top and bottom platens are heated with a circulating hot oil system. The platens are manufactured with internal oil tubes which are designed to provide an even distribution of energy. With a proper heat exchange system and the oil temperature regulation, the platens temperature can be controlled to within a target range +/−3° C.

The tread pattern evaluated for this example is shown in FIG. 2. Due to the large shoulder blocks, the cure time required in the press was 25 minutes using conventional curing conditions in the platen press.

To quantify the state of cure in all sections of the tread, probes were placed in the tread. The first probe was placed about 1 mm below the top surface of the tread. A second probe was placed at about 8 mm below the top surface of the tread; and a third probe was placed at about 14 mm below the top surface, near the center of the tread. The temperature profiles were generated for the three points (see FIG. 4). The state of cure for all sections of the tread should be alpha=0.9.

Inherent in the curing process is the fact that rubber is a very poor conductor of heat, and often, unavoidably, a non-uniform state of cure is often obtained. For this example, using a conventional cure method, the surface of the tread block at 1 mm achieved a sufficient state of cure at approximately 800 seconds (100), while the center of the block at 14 mm required about 1800 seconds of cure time in the press (120).

The mold was modified in accordance with the invention by adding a combination of 2 mm diameter steel heat transfer pins in selected tread blocks. The location and depth of the pins was obtained by a FEA model. An advantage of using the steel pins was the ability to modify an existing mold. Because the mold is fabricated from flat aluminum segments, it is easy to locate and drill precision holes from the back of the mold into the tread molding surface. These pins can then be placed in the holes and fixed in place by numerous methods.

The solution that was developed for this tread design is shown in FIG. 3. The pins were positioned in the mold so that they would protrude into the large shoulder blocks in a 5 pin pattern and perpendicular to the surface of the tread block. The pins protruded into the tread block to a depth of about 14 mm. This arrangement was considered a .good balance between reducing the cure time, while not compromising tire performance.

Figure 4:
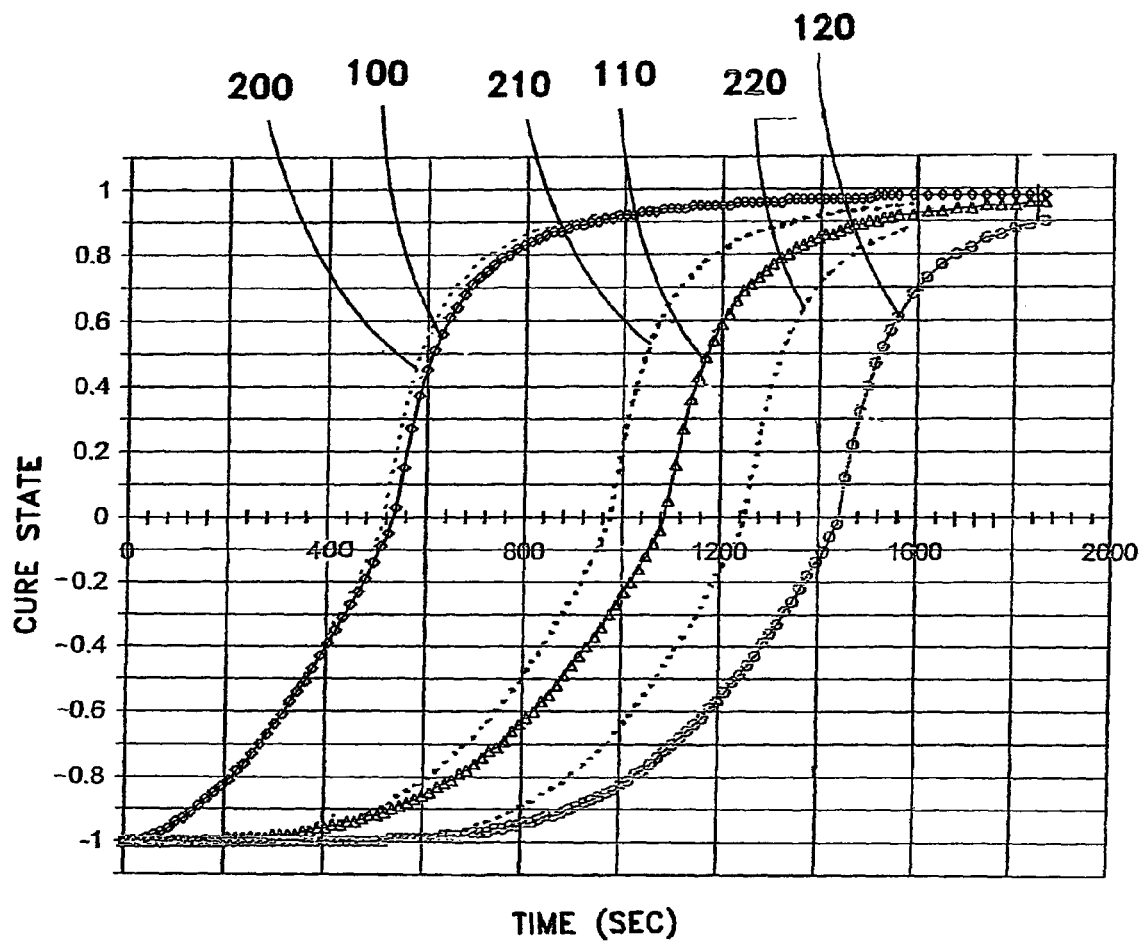
FIG. 4 shows the rate of cure as a function of time for various positions of thermocouple probes in the tread, for the cured treads shown in FIGS. 2 and 3. The first probe is set at a depth of about 1 mm from the top surface of a tread block; the second probe is set at a depth of about 8 mm from the top surface of the same tread block; and the third probe is set at a depth of about 14 mm from the top surface of the same tread block. The cure rates are shown at the 1 mm depth, the 8 mm depth and the 14 mm depth for both the tread cured using the conventional cure method without the pins (100), (110) and (120); and the tread cured using method of this invention with the pins (200), (220) and (220).

FIG. 4 shows the rate of cure as a function of time for various positions of the thermocouple probes in the tread. The first probe was set at a depth of about 1 mm from the top surface of a tread block; the second probe was set at a depth of about 8 m from the top surface of the same tread block; and the third probe was set at a depth of about 14 mm from the top surface of the same tread block. The cure rates are shown in FIG. 4 at the 1 mm depth, the 8 mm depth and the 14 mm depth for both the tread cured using a conventional cure method without the pins (100), (110) and (120); and the tread cured using method of this invention with the pins (200), (210) and (220). Clearly, the tread rubber in the block cures the quickest next to the bottom and top platen, while the rubber near the middle cures the slowest.

In comparing the cure rates at the middle location at 14 mm, (120) and (220), for the tread cured in the standard mold and for the tread cured in the mold adapted with the pins, it is noted that the addition of the pin heat transfer elements reduced the time in the press to cure the tread by approximately three minutes, a 12% reduction in the cure time.

Figure 5:
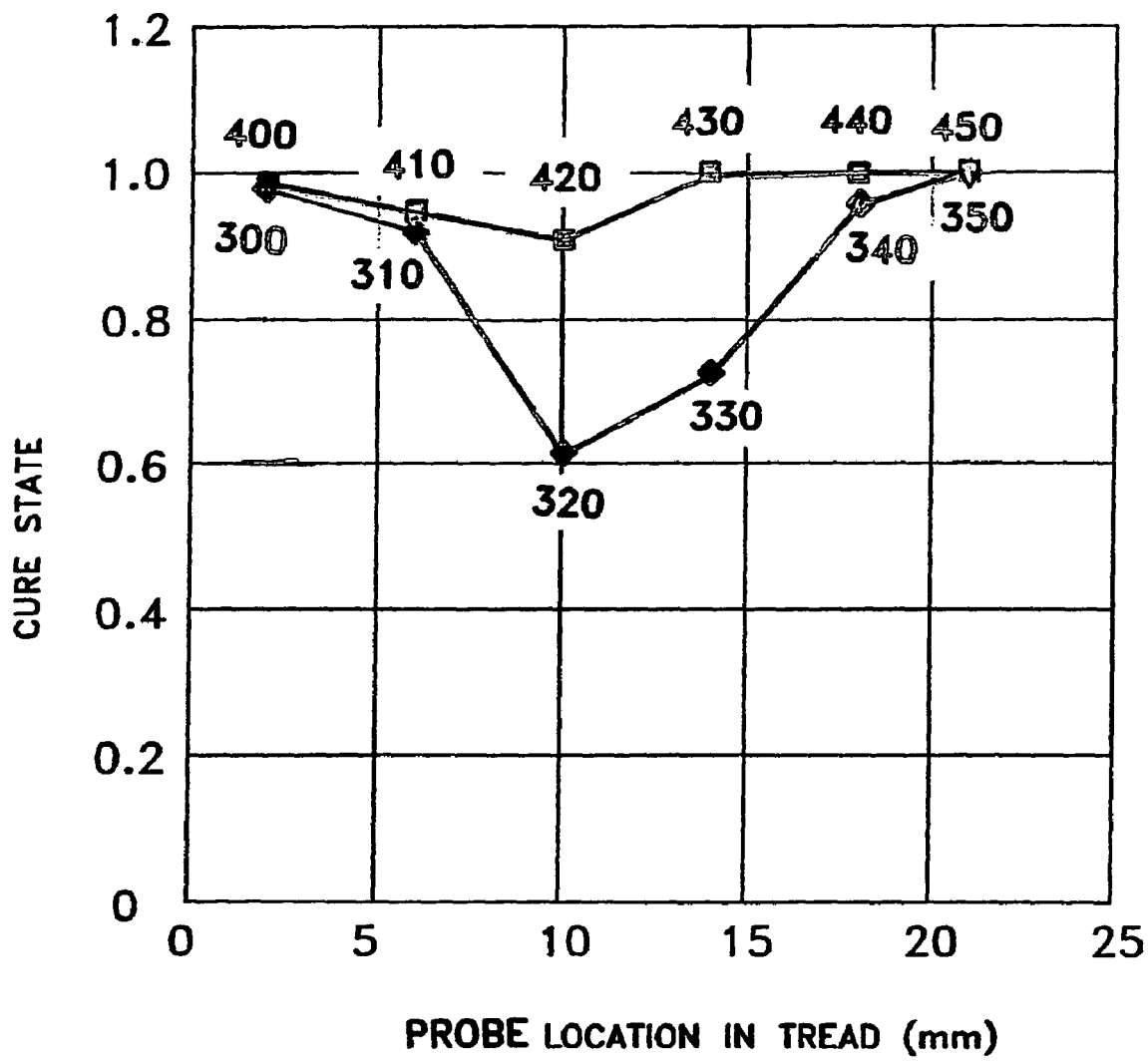
FIG. 5 shows the cure state (alpha) after a fixed press time cure time of 26 minutes at thermocouple probe depths of about 1 mm, about 6 mm, about 10 mm, about 14 mm, about 18 mm and about 22 mm from the top surface of a tread block, for the cured treads shown in FIGS. 2 and 3. The cure states are shown at the 1 mm depth, the 6 mm depth, the 10 mm depth, the 14 mm depth, the 18 mm depth and the 22 mm depth for both the tread cured using the conventional cure method without the pins (300), (310), (320), (330), (340) and (350); and the tread cured using method of this invention with the pins (400), (410), (420), (430), (440) and (450).

FIG. 5 shows the state of cure through the tread block thickness at the end of the cure. The more flat the curve, the more even the state of cure is through the tread block. The figure demonstrates that the addition of the pin heat transfer elements greatly increased the uniformity of cure through the tread block (compare 400, 410, 420, 430, 440 and 450 with 300, 310, 320, 330, 340 and 350).

Figure 6:
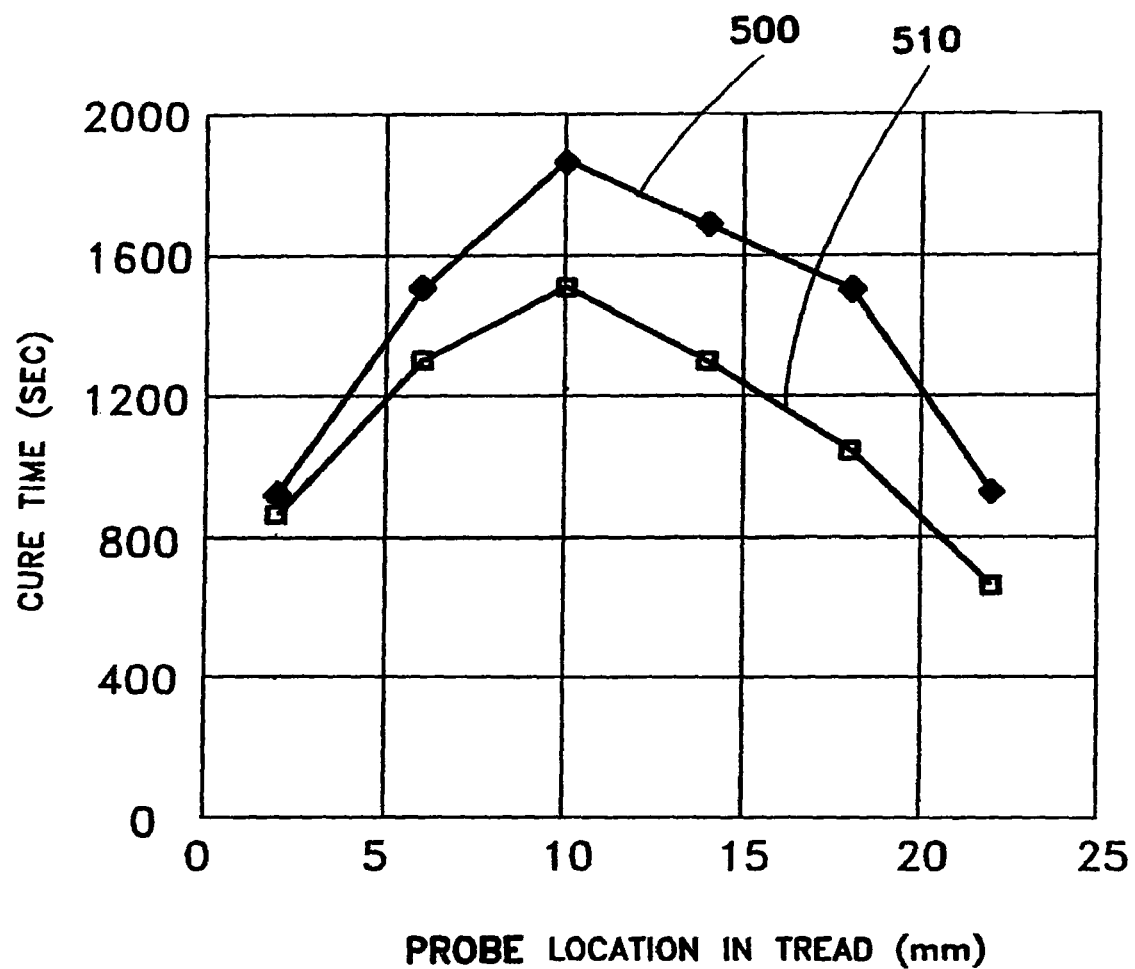
FIG. 6 shows the cure time in seconds needed in the press to reach a cure state of alpha=0.9 at the same thermocouple tread depths given in FIG. 5 above, for the cured treads shown in FIGS. 2 and 3. The time to reach alpha=0.9 at each depth for the tread cured using the conventional cure method is shown as line no. (500), and the time to reach alpha=0.9 at each depth for the tread cured using the method of the invention is shown as line no. (510).

FIG. 6, similarly, shows the time necessary to reach a defined state of cure where $\alpha=0.90$ for different depths in the tread block. It is seen that the addition of the heat transfer pins reduced the total time to cure to $\alpha=0.90$ by about 3 minutes (see 510 versus 500 at the 10 mm location).

The percent reduction in the surface area of the tread block caused by the use of the five-pin formation was about 1%; and the calculated reduction in rigidity of the tread block caused by using the 14 mm pins was only about 2%.

EXAMPLE 2

Modeling the Use of Various Heat Transfer Elements

Figure 7:
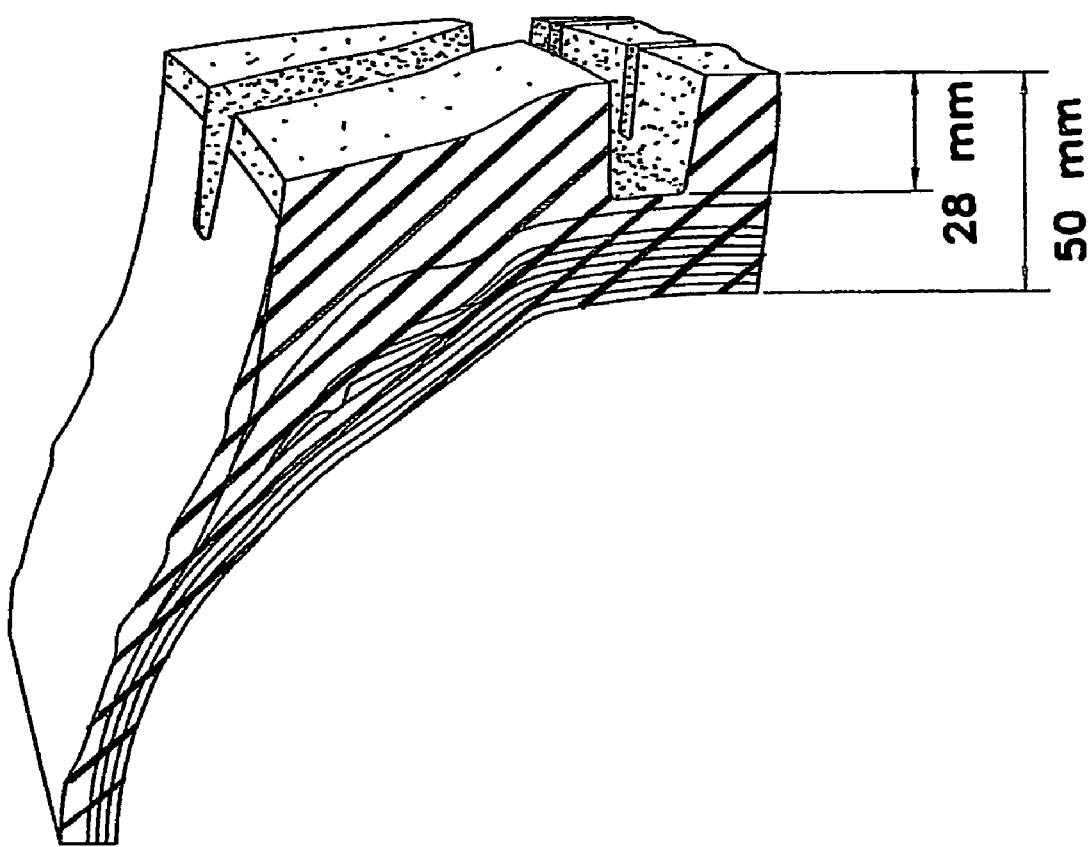
FIG. 7 is a profile of a typical truck tire shoulder area showing the complexity and non-uniform geometry of the tire.

This example uses FEA modeling to show the reduction in cure time that can be achieved by the use of various shapes and types of heat transfer elements placed into a tread block for a typical pneumatic truck tire (FIG. 7 shows the shoulder region of such a tire). The tread block depth was 28 mm and the depth of the lateral grooves was 24 mm. For the reference case (i.e. without using any heat transfer elements), the cure time was calculated to be 57 minutes. The cure of this tire is limited by the cure of the shoulder area. For example, the bead requires 39 minutes to obtain an alpha of 0.9, and the sidewall requires just 22 minutes. Therefore, the bead has 18 minutes of additional heating and the sidewall has 35 minutes of additional heating.

Figure 8:
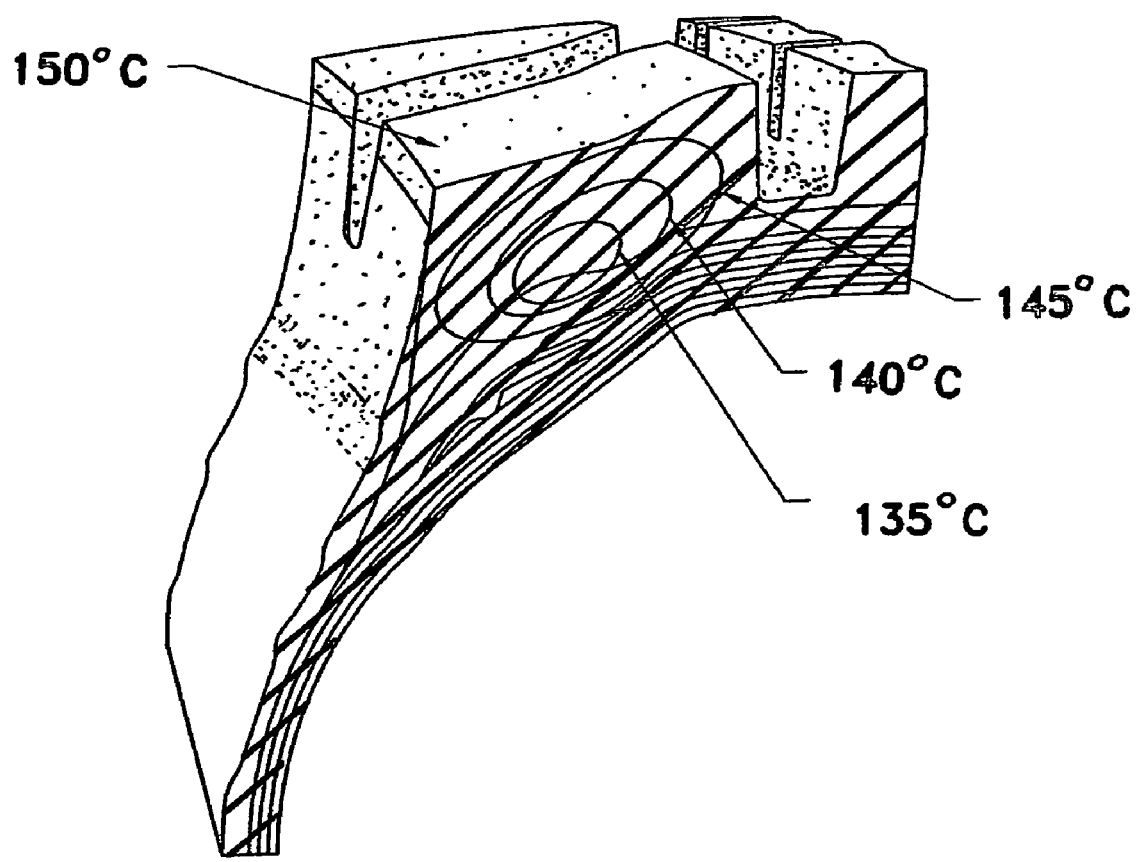
FIG. 8 shows the thermal profile in the shoulder of the truck tire of FIG. 7 when the tire is removed from the press and is cured using conventional time control methods.

FIG. 8 shows the heat "profile" which is developed in the shoulder region of the tire in FIG. 7. It is seen that, at the end of the press cure, the temperature within the center of the tread shoulder block is 15° C. cooler than the temperature at the surface of the tread block.

Figure 9:
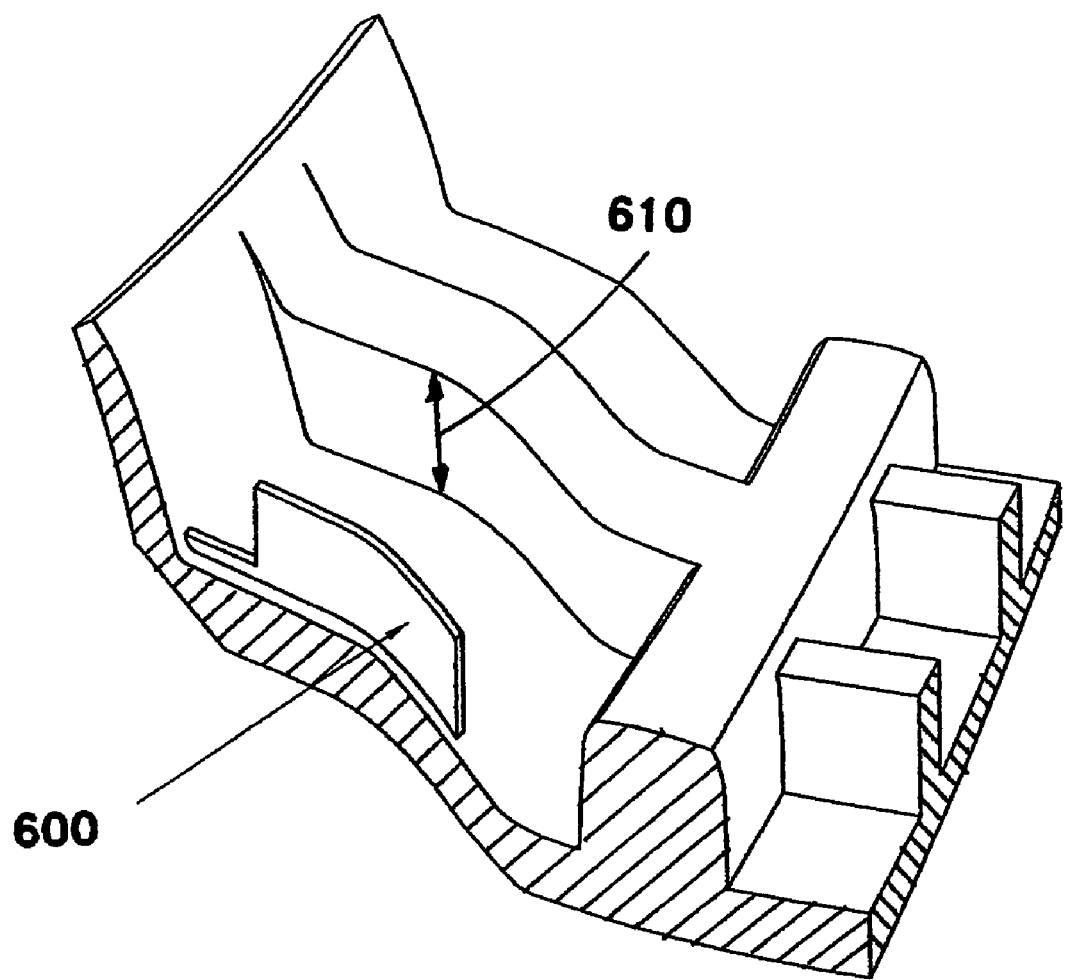
FIG. 9 shows a mold section for the shoulder of a truck tire with an added sipe (600) at about 22 mm height. The mold section which produces the lateral groove at the shoulder has a height of about 24 mm (610).
Figure 10:
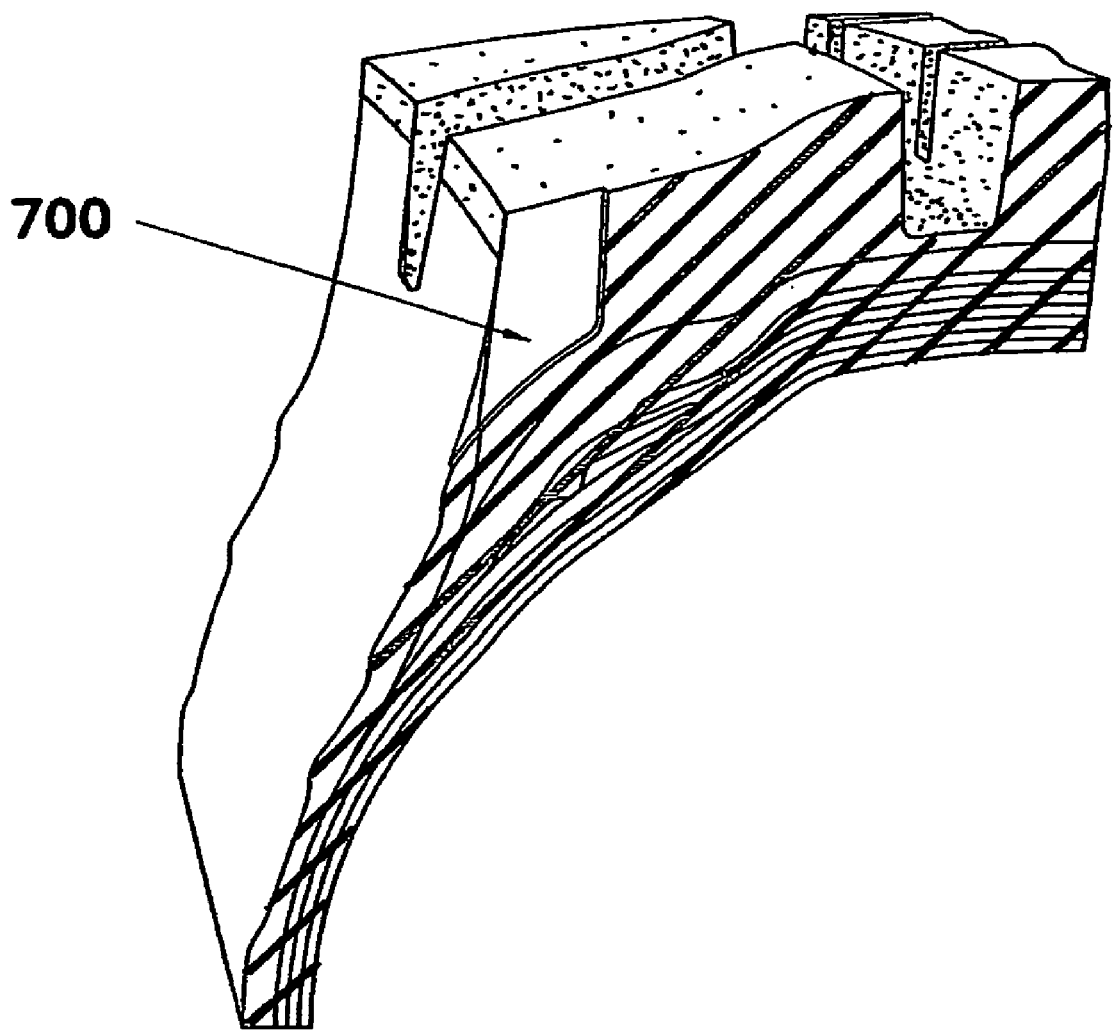
FIG. 10 shows a profile for the shoulder of the truck tire shown in FIG. 7 with an added shoulder groove (700). The average depth of the shoulder groove is about 27 mm, and it is about 8 mm wide and extends about 14 mm laterally into the shoulder tread block.

FIGS. 9, 11, 12 and 13 show examples of molds modified with different configurations of heat transfer elements that may be used to introduce heat into the tread blocks at the shoulders of the tire. FIG. 10 shows a shoulder tread profile where a large shoulder groove was added.

The objective here is to show that, whereas different shapes and types of heat transfer elements can be used to transfer heat energy into cure-limiting zones and reduce the overall cure time, the tire tread rigidity should not be substantially changed. The example shows that, whereas faster cure times can be achieved, the rigidity of the tread block is greatly affected by the use of certain elements. Table 1 summarizes the results.

A. "Full Depth" Sipes.

A large aluminum "full depth" sipe (600) was added to the reference tire mold to transfer heat into the shoulder of the tire. The sipe, which was 2 mm wide, protruded approximately 22 mm into the tread block (FIG. 9). The result from this model showed a cure time of 53.5 minutes or a reduction of 3.5 minutes using one full depth sipe; and a cure time of 50 minutes, a reduction of 7 minutes using three full depth sipes. However, the use of the "full depth" sipes reduces the calculated rigidity of the tread block by 4% and 12% respectively.

B. Large Shoulder Groove.

A large shoulder groove was evaluated as a heat transfer element (FIG. 10). The shoulder groove heat transfer element was added to the mold to add heat to the shoulder block. The average depth of the groove at the shoulder (700) was 27 millimeters. The groove was 8 millimeters wide and penetrated laterally into the shoulder block 14 millimeters. The use of the shoulder groove reduces the cure time to 54 minutes (a 3 minute reduction), but also reduces the calculated rigidity of the tread block by 6%.

C. Mini-Sipes.

Figure 11:
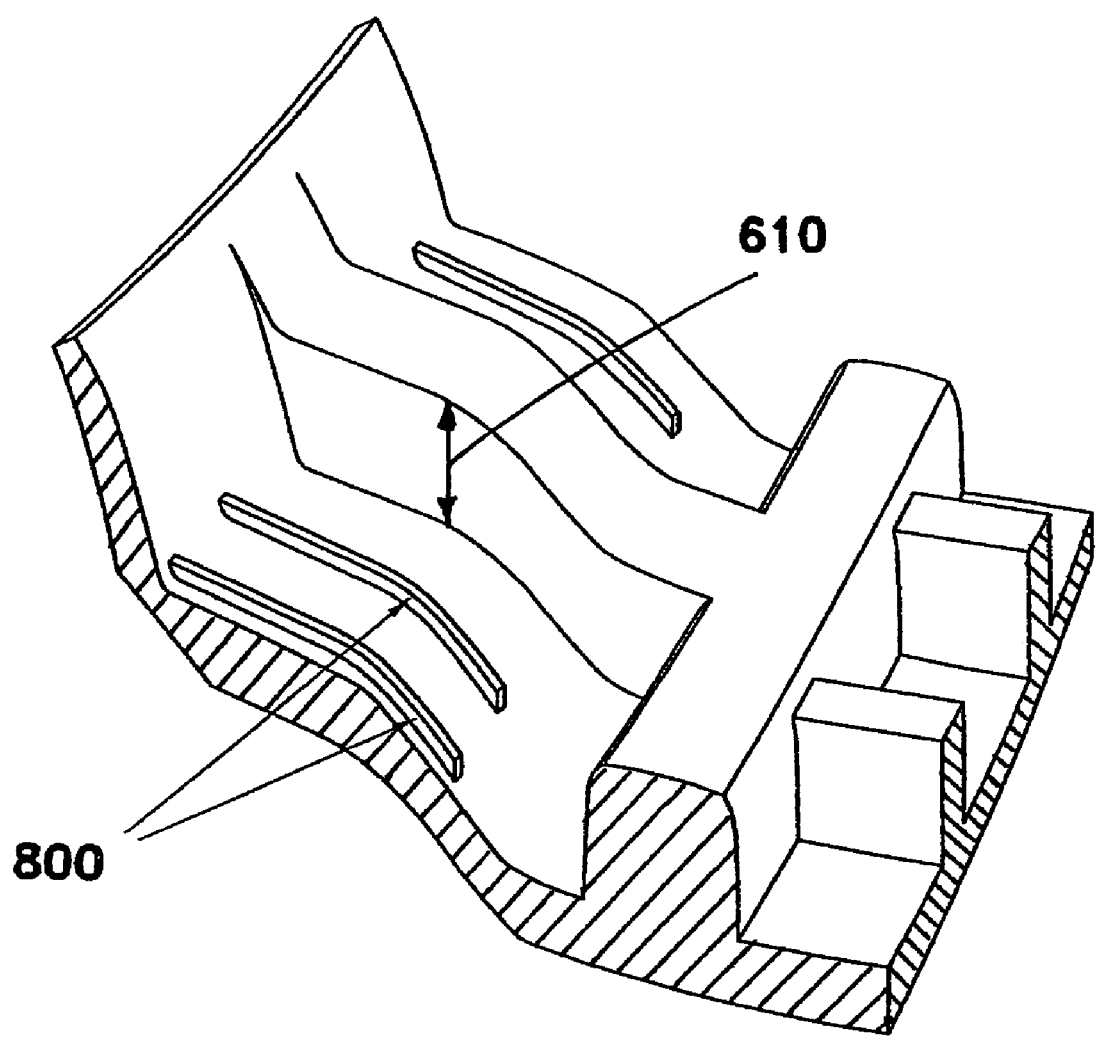
FIG. 11 shows a mold section for a truck tire with added mini-sipes (800) which have a height of about 3 mm. The mold section which produces the lateral groove at the shoulder has a height of about 24 mm (610).

The use of mini-sipes (800); i.e., sipes 2 millimeters in width and extending 3 millimeters in depth into the tread block depth, were evaluated as heat transfer elements (FIG. 11). It is believed that the short mini-sipes would not substantially disturb the rigidity of the tread blocks. This was true as the calculated rigidity was reduced by only about 1%. The use of the three mini-sipes results in a cure time of 56.5 minutes, a 0.5 minute reduction in total time.

D. Wedge Sipes.

Figure 12:
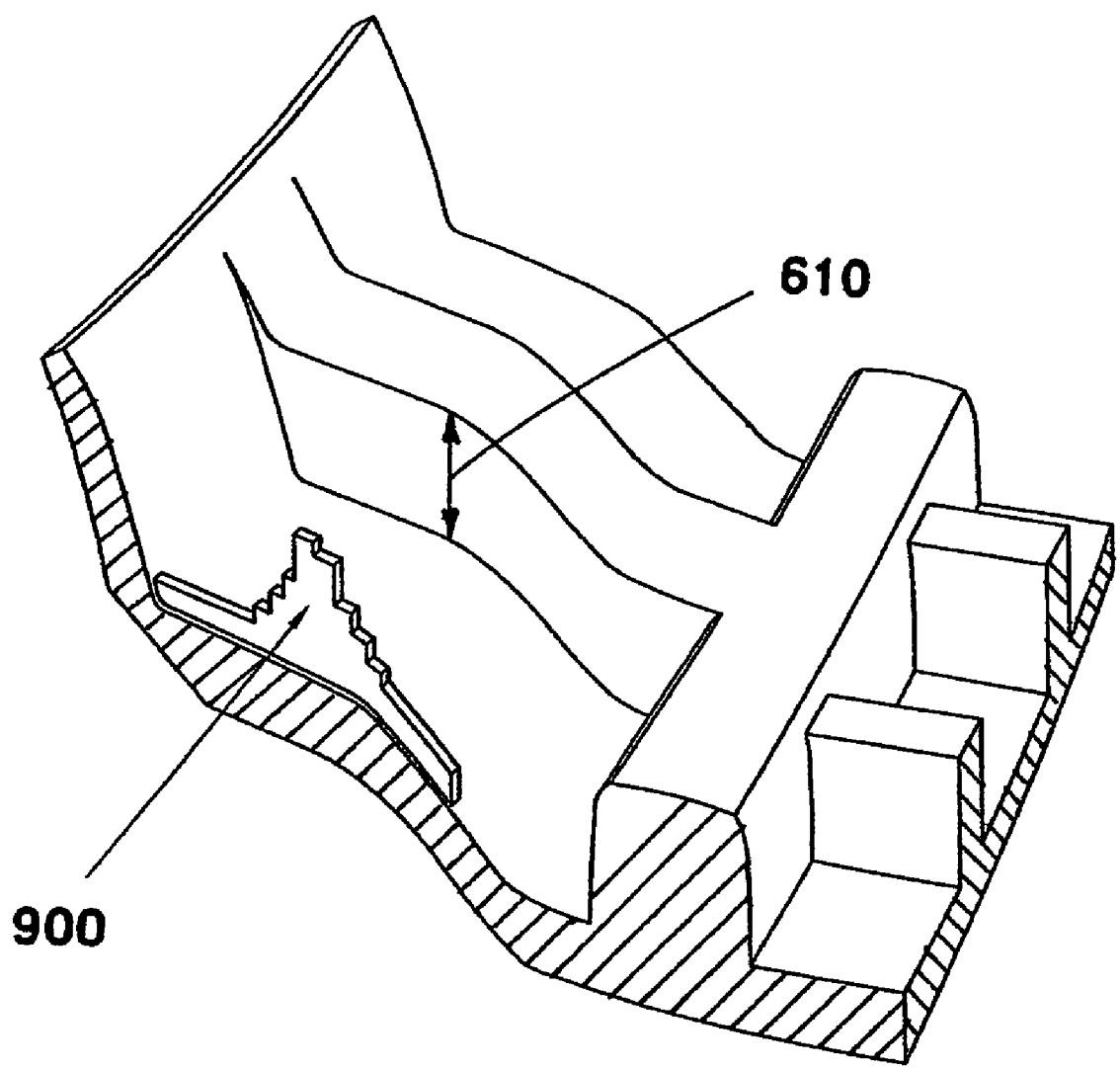
FIG. 12 shows a mold section for the shoulder of a truck tire with an added wedge sipe (900) which has a height of about 22 mm and a 22 mm base. The mold section which produces the lateral groove at the shoulder has a height of about 24 mm (610).
Figure 13:
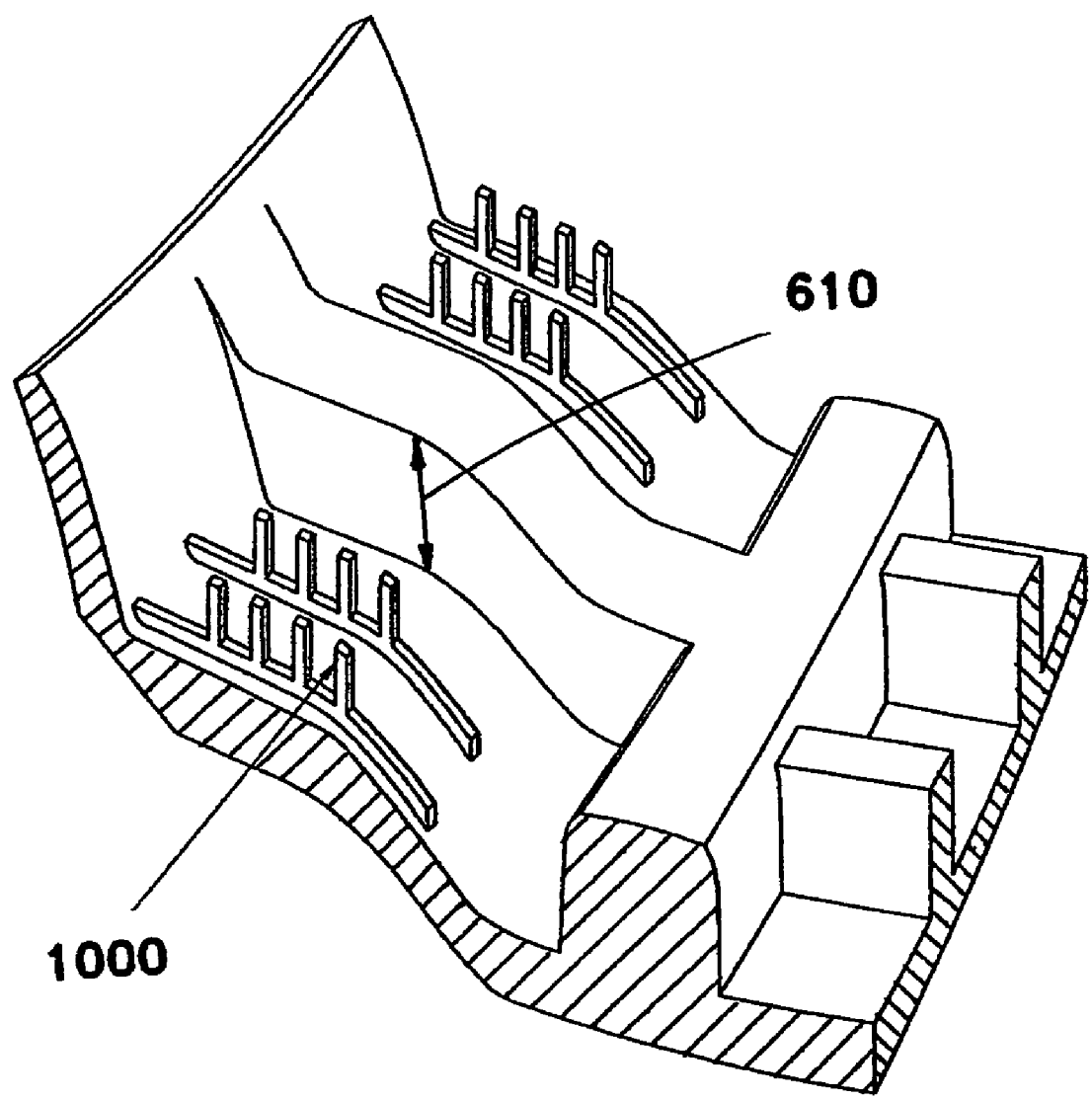
FIG. 13 shows a mold section for a truck tire with added multiple pins (1000) which have a height of about 22 mm. The mold section which produces the lateral groove at the shoulder has a height of about 24 mm (610).

A wedge shaped heat transfer element (900) was also investigated (FIG. 12). The wedge was 2 millimeters wide and 20 millimeters in length at its base, and was placed on the mold to protrude into the block by about 22 millimeters. When one wedge was used, the cure time reduces to 54.5 minutes (a 2.5 minute or about 4% reduction). The use of three wedges reduces the cure time to 52 minutes (a 5 minute or about 9% reduction). The calculated rigidity of the blocks was reduced by 1% and 4% respectively.

E. Heat Transfer Pins.

Evaluations were conducted with two sets of four heat transfer pins (1000) having varying lengths of 7, 10, 14, 17, 19, and 22 millimeters. These pins were used in combination with the shallow mini-sipes as described in Point C above (see FIG. 13). The use of both types of heat transfer elements gives improved aesthetics because the pinholes are hidden in the mini-sipes.

The use of the pins, combined with the mini-sipes, results in cure time reductions of 2 minutes for 7 millimeter length pins; 3 minutes for a 10 millimeter length pins; 4.5 minutes for 14 millimeter length pins; 5.5 minutes for 17 millimeter length pins; 7.5 minutes for 19 millimeter length pins; and 9 minutes for 22 millimeter length pins. The calculated rigidity of the tread block for each of the pin lengths ranged from a 1% to a 3% reduction.

TABLE 1

Summary of results from FEA Modeling of Different Heat Transfer Elements.

| Case | Cure Time in Minutes | % Cure time Reduction | Calculated % Reduction in Rigidity | % Reduction in Surface Area |
|---|---|---|---|---|
| Base case | 57 | 0% | — | — |
| One full sipe depth | 53.5 | 6% | 4% | 1.7% |
| Three full depth sipes | 50 | 12% | 12% | 5.2% |
| Shoulder Groove | 54 | 5% | 6% | 1.9% |

TABLE 1-continued

Summary of results from FEA Modeling
of Different Heat Transfer Elements.

| Case | Cure Time in Minutes | % Cure time Reduction | Calculated % Reduction in Rigidity | % Reduction in Surface Area |
|---|---|---|---|---|
| Three mini-sipes | 56.5 | 1% | 1% | 5.2% |
| One wedge | 54.5 | 4% | 1% | 1.2% |
| Three wedges | 52 | 9% | 4% | 3.7% |
| Mini-Sipes (M.S.) & 7 mm pins | 55 | 4% | 1% | 0.8% |
| M.S. & 10 mm pins | 54 | 5% | 1% | 0.8% |
| M.S. & 14 mm pins | 52.5 | 8% | 2% | 0.8% |
| M.S. & 17 mm pins | 51.5 | 10% | 2% | 0.8% |
| M.S. & 19 mm pins | 49.5 | 13% | 3% | 0.8% |
| M.S. & 22 mm pins | 48 | 16% | 3% | 0.8% |

The objective is to reduce the cure time in the press without significantly changing the rigidity of the tread block. Hence, the heat transfer elements are chosen to keep the calculated reduction in rigidity at 4% or below, and preferably at 2% or less.

EXAMPLE 3

Truck Tire

This example demonstrates the application of this invention to reduce the cure time in the press for a real "drive axle" truck tire. An existing truck tire design was chosen because of the long cure time required to sufficiently cure all parts of the tire. This tire dimension required 52 minutes under normal press cure conditions. An FEA model was used to evaluate the tire. It was determined that the large tread blocks on the shoulder of the tire were the cure-limiting zones. Using the FEA model, a configuration of heat transfer elements were introduced into the mold for the tire.

An arrangement of 8 heat transfer pins for the shoulder tread blocks, and a single mini-sipe (1100) having 3 pins included therein for internal tread blocks was chosen. The types of heat transfer elements and the pattern was developed to obtain a reduction in cure time without substantially changing the rigidity of the tread blocks. The objection is to not substantially change the performance of the tire. A representation of the placement of the cure pins and mini-sipes into the tread blocks is shown in FIG. 14(a). These pins are 2 mm in diameter and protrude 14 mm into the tread block (50% of the tread depth which is 28 mm) (FIG. 14(b)). The pins are manufactured of steel and can be readily incorporated into the existing mold or fabricated directly in a new mold.

As can be seen in FIG. 14, a pattern of 8 pins were used in the shoulder blocks, and a pattern of a mini-sipe having 3 pins in it were used for the internal tread blocks. The mini-sipes were 2 mm wide, protruded 3 mm in depth into the block and were contained in the boundary of the tread block. (FIG. 14(c)).

Using the method of this invention, the cure time in the press was 47.5 minutes, a reduction of 8% in the time required to obtain cure to the defined state where alpha=0.9.

The calculated reduction in the rigidity of the shoulder tread block was about 2% using the 8-pin configuration, and the reduction in surface area was less than 1%. The calculated reduction in rigidity in the internal tread block using the combination of the mini-sipe and 3-pins was about 2%, and the reduction in surface area was less than 2%.

FIG. 14(a) shows the sculpture of the cured tire. These tires were tested to evaluate wear rates and block durability. The wear results demonstrated that the performance of the tires was maintained. The tires were run on an on/off aggressive road course in Silver Springs Nev. After 3600 miles, the weight loss and wear rate of the reference tire (made with no heat transfer elements) was 46.53 grams/100 miles and 10.36 mm/10 k miles respectively; and the weight loss and wear rate for the tire of this invention was 48.75 grams/100 miles and 10.51 mm/10k miles. Hence the tire of the invention showed only a 1% reduction in wear rate from that of the reference tire. Hence, no substantial change occurred in the wear rate of the tire. In additional field testing, the reference tire was evaluated against the tire of this invention and the tire of the invention demonstrated equivalent performance with respect to tread tearing, chunking, chipping, and general tread durability as the reference tire.

In summary, an arrangement of heat transfer pins was determined by using a FEA modeling technique, a prototype mold was built, and truck tires were cured and subsequently tested. The method of the invention demonstrated a 4.5 minute, or 8% reduction in cure time in the press as compared to the conventional process. This reduction was validated by thermocouple measurements, which were used to set the cure time required to meet the target cure state of alpha=0.9. Tire testing indicated that the method of this invention can significantly reduce cure time in the press without significantly degrading the performance for the original tire design.

We claim:

1. A method of curing a non-uniform, thick rubber article in a mold comprising the steps of:
    predetermining the cure rates of the article in its parts to determine one or more cure-limiting parts;
    selecting one or more cure-limiting parts;
    inserting one or more pin heat transfer elements into the article, the one or more heat transfer elements protruding outward from an inner surface of the mold into the article at said selected cure-limiting parts;
    placing the article inside the mold;
    applying heat to the article and the one or more heat transfer elements until the article reaches a defined state of cure; and
    removing the article from the mold;
    wherein the cured article has a calculated percent reduction in the surface area of the one or more selected cure-limiting parts of 8% or less.

2. The method of claim 1, wherein the article is a large tire.

3. The method of claim 2, wherein the tire is a truck tire.

4. The method of claim 1, wherein the article is a tread for a tire.

5. The method of claim 1, wherein the step of inserting the one or more pin heat transfer elements further comprises:
    inserting the one or more of the heat transfer elements at a depth of between 5% and 80% of the thickness of said selected cure-limiting parts.

6. The method of claim 5, wherein the article is a large tire and the one or more cure-limiting parts include a tread block.

7. A method of making a mold for curing a non-uniform, thick rubber article, the method comprising the steps of:
    predetermining the curing rates of substantially all portions of the article to be inserted into the mold,
    selecting one or more cure-limiting parts of the article,
    affixing one or more pin heat transfer elements to protrude from the Inner surface of the mold, and arranging the one or more heat transfer elements affixed to the mold so that the elements are aligned to insert within the selected cure-limiting parts of the article when the article is cured in the mold.

8. The method of claim 1, further comprising obtaining a calculated percent reduction in rigidity of the selected one or more cure-limiting parts of 4% or less.

* * * * *